(12) United States Patent
Dunshea et al.

(10) Patent No.: US 7,080,220 B2
(45) Date of Patent: Jul. 18, 2006

(54) PAGE REPLACEMENT WITH A RE-REFERENCE INDICATOR

(75) Inventors: Andrew Dunshea, Austin, TX (US); Dirk Michel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 10/614,628

(22) Filed: Jul. 3, 2003

(65) Prior Publication Data

US 2005/0005080 A1 Jan. 6, 2005

(51) Int. Cl.
*G06F 12/00* (2006.01)

(52) U.S. Cl. ...................... 711/159; 711/203
(58) Field of Classification Search ............... None
See application file for complete search history.

(56) References Cited

U.S. PATENT DOCUMENTS

| | | | |
|---|---|---|---|
| 5,193,172 A | 3/1993 | Arai et al. ............ | 395/425 |
| 5,394,539 A | 2/1995 | Neuhard et al. ........ | 395/425 |
| 5,758,120 A | 5/1998 | Kahle et al. | |
| 6,594,742 B1 * | 7/2003 | Ezra ................. | 711/159 |
| 6,886,085 B1 * | 4/2005 | Shuf et al. ........... | 711/159 |
| 2002/0120808 A1 | 8/2002 | Dyck et al. .......... | 711/6 |
| 2002/0120822 A1 | 8/2002 | Sutherland et al. ..... | 711/159 |
| 2003/0084253 A1 * | 5/2003 | Johnson et al. ........ | 711/144 |
| 2004/0181633 A1 * | 9/2004 | Azuma ............... | 711/133 |

* cited by examiner

*Primary Examiner*—Mano Padmanabhan
*Assistant Examiner*—Craig E Walter
(74) *Attorney, Agent, or Firm*—Marilyn Smith Dawkins; Owen J. Gamon

(57) ABSTRACT

A method, apparatus, processor, system, and signal-bearing medium that in an embodiment determine which page to replace in memory when the memory is full based on reference and re-reference indicators in page table entries. In an embodiment, a reference indicator in an entry is set when its associated page is accessed in memory and the reference indicator was previously clear. The re-reference indicator in an entry is set when its associated page is accessed and the reference indicator was previously set. Both the reference and re-reference indicators are cleared if their associated page is accessed and both were previously set. When a new page is accessed and the memory is full, a page in the memory is not available for replacement if both its reference and its re-reference indicators are set. Otherwise, the page is available for replacement.

19 Claims, 4 Drawing Sheets

PAGE REPLACEMENT WITH A RE-REFERENCE INDICATOR

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

An embodiment of the invention relates generally to a replacement technique for pages in memory using a re-reference indicator.

BACKGROUND

A computer system stores data in its memory. In order to do useful work, the computer system operates on and performs manipulations against this data. Ideally, a computer system would have a singular, indefinitely large and very fast memory, in which any particular data would be immediately available to the computer system. In practice this has not been possible because memory that is very fast is also very expensive.

Thus, computers typically have a hierarchy (or levels) of memory, each level of which has greater capacity than the preceding level but which is also slower with a less expensive per-unit cost. These levels of the hierarchy may form a subset of one another, that is, all data in one level may also be found in the level below, and all data in that lower level may be found in the one below it, and so on until we reach the bottom of the hierarchy. In order to minimize the performance penalty that the hierarchical memory structure introduces, it is desirable to store the most-frequently-used data in the fastest memory and the least-frequently-used data in the slowest memory.

Although a computer system might contain any number of levels of memory, consider the following example where the computer system contains two levels of memory:

1) a small, fast, and moderately expensive RAM (Random Access Memory)—often called main memory—that contains the most-frequently-used data; and
2) several large, slow, inexpensive disk drives that contain all the data in the computer system.

When the computer system needs to allocate memory for data, it looks first in the main memory. If memory is not available in the main memory (no memory is free), the computer system must determine which data to remove from the main memory in order to make room for the data currently needed. For efficiency, data may be moved or migrated between levels of storage in units called pages. A page may be a fixed or variable length block of data that is moved as a unit. A page may also be called a page frame. The process of freeing pages in main memory to meet the demands of currently active work is called paging, page replacement, or page stealing.

The algorithm used to select which page is moved back through the levels (i.e., which page to steal or replace) is called the replacement algorithm. Often, a "least-recently-used" algorithm is used to govern movement of pages. That is, pages that have not recently been referenced are replaced first. Thus, if a page is not used for an extended period of time, it will migrate through the storage hierarchy to the slowest level. Hence, the most-recently-used data is contained in high-speed, main storage ready for immediate access, while less-frequently-used data migrates though the storage hierarchy toward the slower-speed storage, often called secondary storage.

Since a page may migrate across multiple physical addresses in the hierarchy of multiple storage devices, a technique called virtual addressing is often used, where a page has a virtual address, which does not change regardless of the physical address at which the page is currently stored. To handle the mapping of virtual addresses to physical addresses and migration of pages through the hierarchy, a page table is often used. The page table has an entry for each page and control information that is used to implement the replacement algorithm.

An example of control information is a reference bit, which indicates whether the page has been referenced or accessed. A typical page replacement algorithm uses the reference bit to determine whether to replace or steal a page. The page replacement algorithm replaces or steals the page if the page's reference bit is not set (is clear), and if the reference bit is set, the page replacement algorithm clears the reference bit without stealing the page. Since the reference bit is set once a page is accessed, each page scanned by the page replacement algorithm for the first time will have a reference bit that is set, so the page cannot be stolen. If none of the pages are allowed to be replaced or stolen, a second pass through the memory is required, replacing or stealing those pages whose reference bits continue to be clear. This additional pass through memory takes time, which hurts the performance of the computer system.

In order to increase performance, what is needed is a technique that allows a better selection of pages that can be stolen.

SUMMARY

A method, apparatus, processor, system, and signal-bearing medium are provided that in an embodiment determine which page to replace in memory when the memory is full based on reference and re-reference indicators in page table entries. In an embodiment, a reference indicator in an entry is set when its associated page is accessed in memory and the reference indicator was previously clear. The re-reference indicator in an entry is set when its associated page is accessed and the reference indicator was previously set. Both the reference and re-reference indicators are cleared if their associated page is accessed and both were previously set. When a new page is accessed and the memory is full, a page in the memory is not available for replacement if both its reference and its re-reference indicators are set. Otherwise, the page is available for replacement.

DETAILED DESCRIPTION

Figure 1:
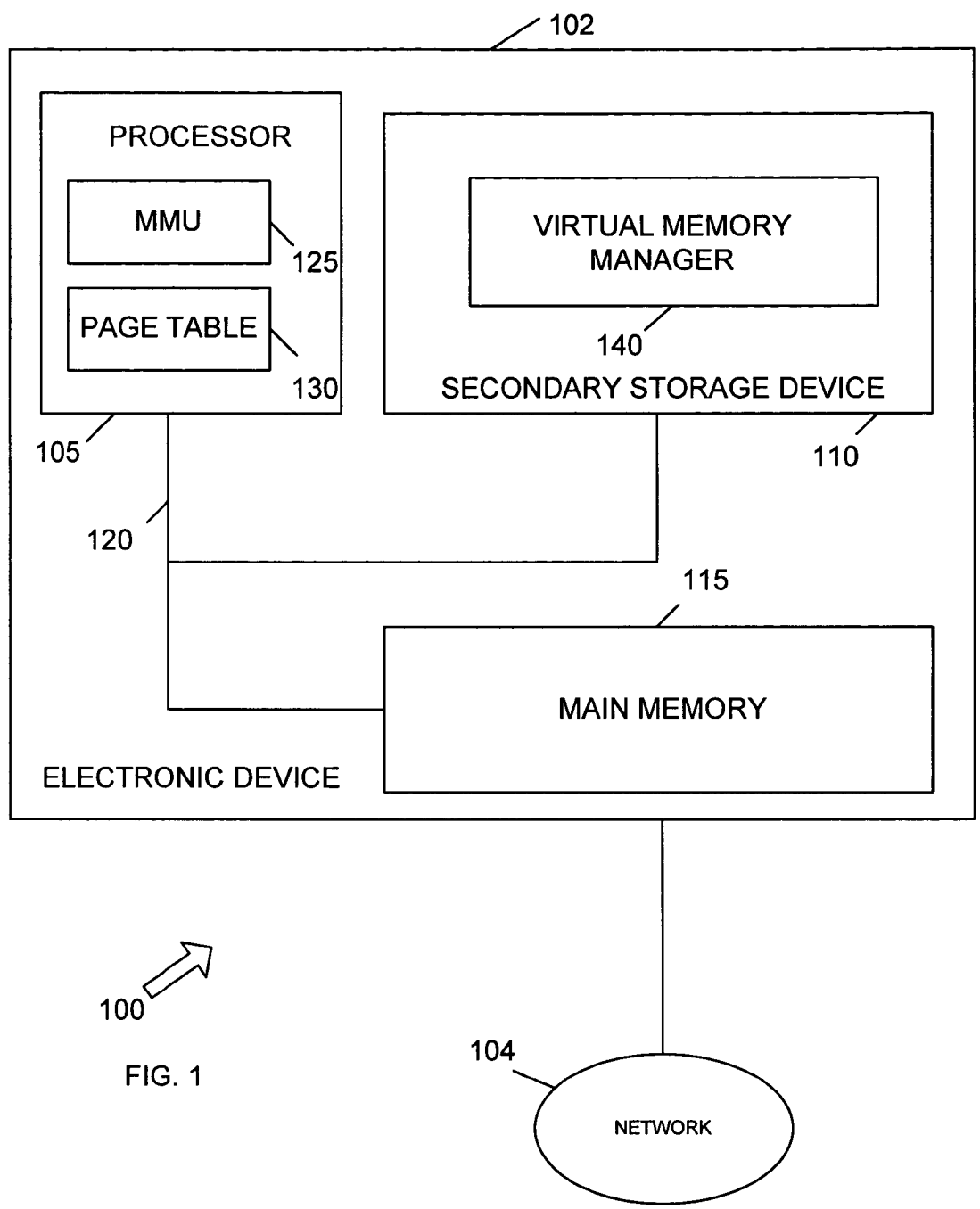
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a network 104. Although only one electronic device 102 and one network 104 are shown, in other embodiments any number or combination of them may be present. In another embodiment, the network 104 is not present.

The electronic device 102 includes a processor 105 connected to secondary storage device 110 and main memory 115 via a bus 120. The processor 105 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 105 executes instructions and includes that portion of the electronic device 102 that controls the operation of the entire electronic device. The processor 105 reads and/or stores code and data to/from the secondary storage device 110 and/or the main memory 115.

The processor 105 includes a memory management unit (MMU) 125 and a page table 130. The memory management unit 125 maps virtual memory addresses to physical memory addresses using the page table 130. The functions of the memory management unit 125 are further described below with reference to FIG. 3. Although the memory management unit 125 is drawn as being part of the processor 105, in another embodiment the memory management unit 125 may be separate from the processor 105. Although the page table 130 is drawn as being part of the processor 105, in another embodiment, the page table 130 may be separate from the processor 105; for example, the page table 130 may be included within the main memory 115. The page table 130 is further described below with reference to FIG. 2.

Although not depicted in FIG. 1, the processor 105 may include a variety of other elements not necessary to understanding an embodiment of the invention. For example, the processor 105 may also include a variety of execution units for executing instructions during a processor cycle, a bus interface unit for interfacing to the bus 120, a fetcher for fetching instructions, and queues and/or caches for holding instructions and data. In other embodiments, the processor 105 may include any appropriate elements.

Although the electronic device 102 is shown to contain only a single processor 105 and a single bus 120, the present invention applies equally to electronic devices that may have multiple processors and multiple buses with some or all performing different functions in different ways.

The secondary storage device 110 represents one or more mechanisms for storing data. For example, the secondary storage device 110 may include random access memory (RAM), magnetic disk storage media, optical storage media, flash memory devices, and/or other machine-readable media. In other embodiments, any appropriate type of storage device may be used. Although only one secondary storage device 110 is shown, multiple storage devices and multiple types and levels of storage devices may be present. Further, although the electronic device 102 is drawn to contain the secondary storage device 110, it may be distributed across other electronic devices, for example when electronic devices are connected in a network, such as the network 104.

The secondary storage device 110 includes a virtual memory manager 140. The virtual memory manager 140 may include instructions capable of being executed by the processor 105 and/or statements capable of being interpreted by instructions that execute on the processor 105. In another embodiment, some or all of the functions of the virtual memory manager 140 may be implemented via logic gates and/or other hardware mechanisms. The virtual memory manager 140 may perform paging functions to move pages (including itself) between the secondary storage device 110 and the main memory 115. The functions of the virtual memory manager 140 are further described below with reference to FIG. 4.

The main memory 115 represents one or more mechanisms for storing data. For example, the main memory 115 may include a cache or caches or random access memory of any appropriate type. Although only one main memory 115 is shown, multiple memories and multiple types and levels of memory may be present. In an embodiment, the main memory 115 is smaller with a faster access time than the secondary storage device 110.

The bus 120 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 104 may be any suitable network or combination of networks and may support any appropriate protocol suitable for communication of data and/or code to/from the electronic device 102. In various embodiments, the network 104 may represent a storage device or a combination of storage devices, either connected directly or indirectly to the electronic device 102. In an embodiment, the network 104 may support Infiniband. In another embodiment, the network 104 may support wireless communications. In another embodiment, the network 104 may support hard-wired communications, such as a telephone line or cable. In another embodiment, the network 104 may support the Ethernet IEEE (Institute of Electrical and Electronics Engineers) 802.3x specification. In another embodiment, the network 104 may be the Internet and may support IP (Internet Protocol). In another embodiment, the network 104 may be a local area network (LAN) or a wide area network (WAN). In another embodiment, the network 104 may be a hotspot service provider network. In another embodiment, the network 104 may be an intranet. In another embodiment, the network 104 may be a GPRS (General Packet Radio Service) network. In another embodiment, the network 104 may be any appropriate cellular data network or cell-based radio network technology. In another embodiment, the network 104 may be an IEEE 802.11B wireless network. In still another embodiment, the network 104 may be any suitable network or combination of networks. Although one network 104 is shown, in other embodiments any number of networks (of the same or different types) may be present.

As will be described in detail below, aspects of an embodiment of the invention pertain to specific apparatus and method elements implementable on a computer, processor, or other electronic device. In another embodiment, the invention may be implemented as a program product for use with a computer, processor, or other electronic device. The programs defining the functions of this embodiment may be delivered to the computer, processor, or other electronic device via a variety of signal-bearing media, which include, but are not limited to:

(1) information permanently stored on a non-rewriteable storage medium, e.g., a read-only memory device attached to or within a computer, processor, or other electronic device, such as a CD-ROM readable by a CD-ROM drive;

(2) alterable information stored on a rewriteable storage medium, e.g., a hard disk drive or diskette; or (3) information conveyed to a computer, processor, or other electronic device by a communications medium, such as through a computer or a telephone network, e.g., the network 104, including wireless communications.

Such signal-bearing media, when carrying machine-readable instructions that direct the functions of the present invention, represent embodiments of the present invention.

Figure 2:
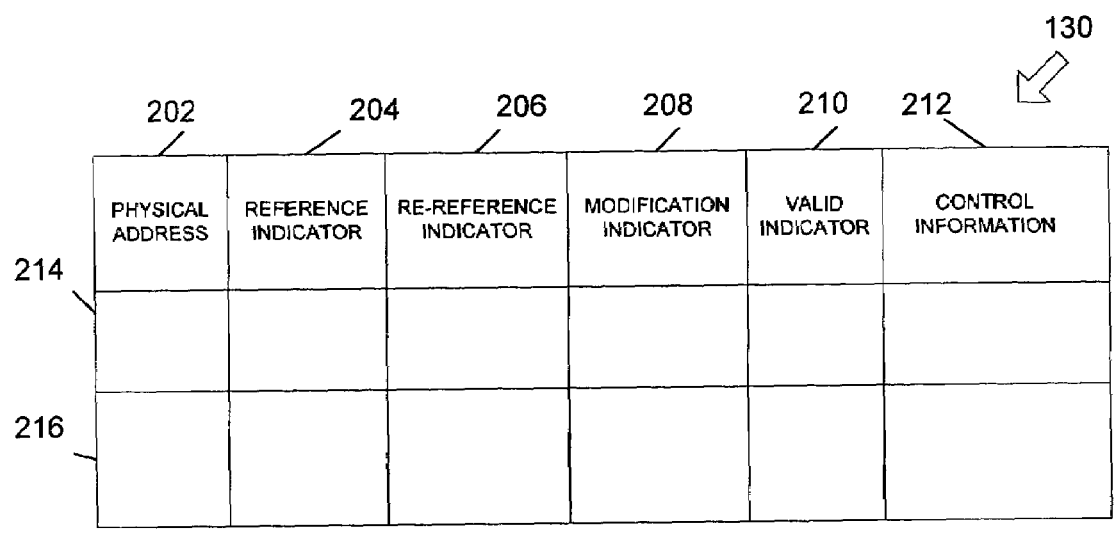
FIG. 2 depicts a block diagram of a page table, according to an embodiment of the invention.

FIG. 2 depicts a block diagram of the page table 130, according to an embodiment of the invention. The page table 130 includes a physical address field 202, a reference indicator field 204, a re-reference indicator field 206, a modification indicator field 208, a valid indicator field 210, and control information 212.

The physical address field 202 contains the physical address of the data in the main memory 115 that is associated with the entry in the page table 130. The reference indicator field 204 indicates whether the page associated with the entry has been accessed since the page was loaded into the main memory 115. The re-reference indicator field 206 indicates whether the page associated with the entry has been accessed again subsequent to the reference indicator 204 being set. The setting and clearing of the reference indicator field 204 and the re-reference indicator field 206 are further described below with reference to FIGS. 3 and 4. The modification indicator field 208 indicates whether the page associated with the entry has been modified since the page was stored in the main memory 115. The valid indicator field 210 indicates whether the entry is valid, that is, whether the page associated with the virtual address is within the main memory 115.

The control information field 212 may include any other information needed by the memory management unit 125 or the virtual memory manager 140. In various embodiments, examples of data that the control information field 212 may include are a dirty indicator indicating whether the page has been written to without being stored in the secondary storage 110, a user indicator indicating whether the page is accessible for a user process, a write enable indicator indicating whether writes to the page are allowed, or any other appropriate control information. In other embodiments, the control information 212 is optional, not used, or not present. In other embodiments, the page table 130 may include more, fewer, or different fields from those shown.

The page table 130 also includes two entries 214 and 216, which include data in the aforementioned fields 202, 204, 206, 208, 210, and 212. Although two page table entries 214 and 216 are shown, in another embodiment, the page table 130 may include an entry for every virtual address in the electronic device 102. In other embodiments, any number of entries in the page table 130 may be present. In an embodiment, the memory management unit 125 uses a virtual address as an index into the page table 130 to find the entry associated with the virtual address. In another embodiment, the memory management unit 125 uses a hashing function to find the entry associated with the virtual address. In another embodiment, the memory management unit 125 uses a translation lookaside buffer (TLB) to map from a virtual address to an associated entry in the page table 130. In other embodiments, any appropriate technique for mapping from a virtual address to the associated entry in the page table 130 may be used.

In an embodiment the fields 204, 206, 208, and 210 are stored as bit indicators, e.g., "0" when cleared and "1" when set, but in other embodiments any appropriate indications and encodings may be used.

Figure 3:
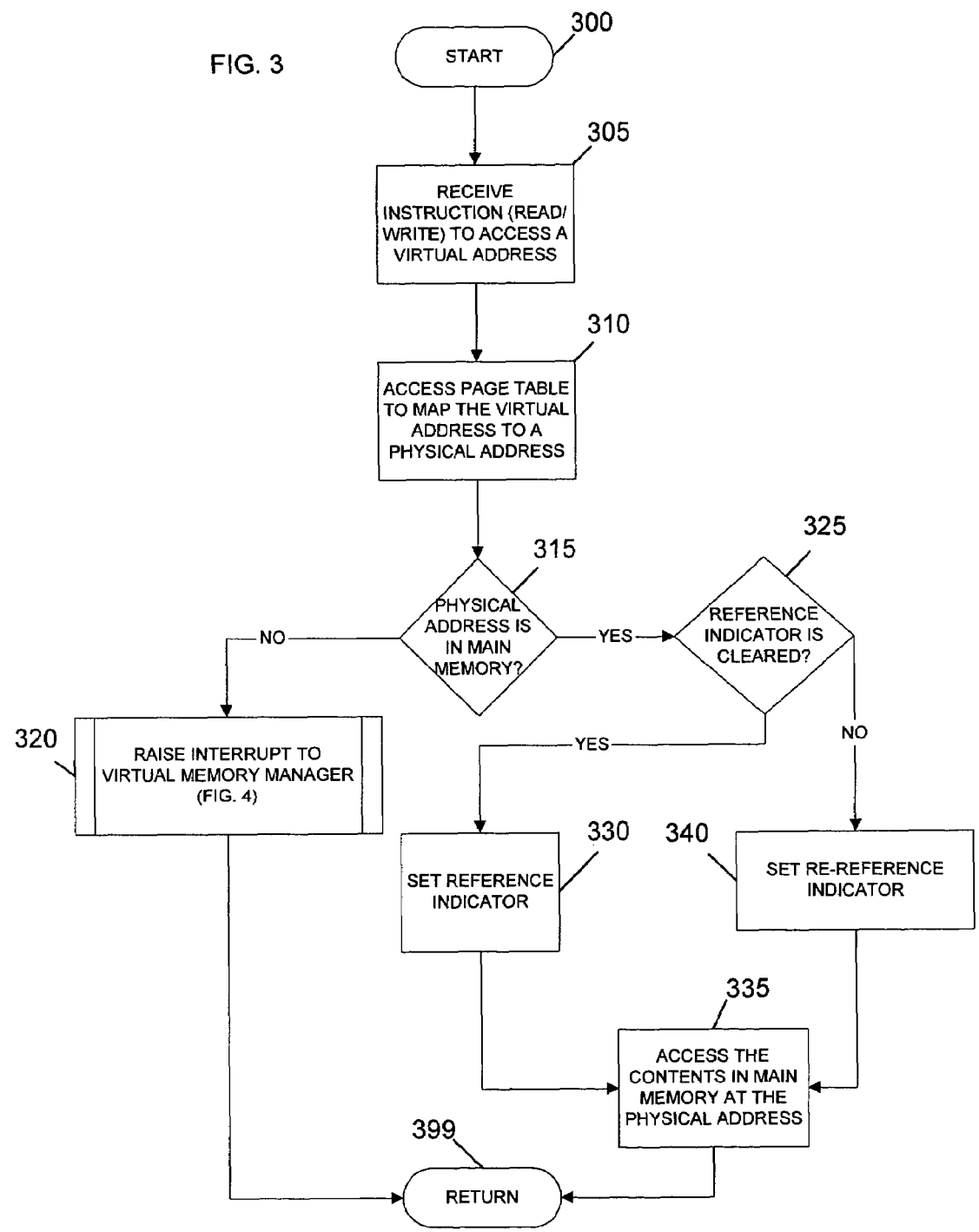
FIG. 3 depicts a flowchart of example processing for a memory management unit, according to an embodiment of the invention.

FIG. 3 depicts a flowchart of example processing for the memory management unit 125, according to an embodiment of the invention. Control begins at block 300. Control then continues to block 305 where the memory management unit 125 receives an instruction that requires access to a virtual memory address. Examples of such instructions are read, write, load, and, store, but in other embodiments any appropriate instruction may be used.

Control then continues to block 310 where the memory management unit 125 maps the virtual memory address in the instruction to a physical address and accesses the page table 130. Control then continues to block 315 where the memory management unit 125 determines whether the physical address obtained from the page table entry is included within main memory 115. In an embodiment, the memory management unit 125 may make the determination at block 315 via the valid indicator 210 for the current entry in the page table 130, as previously described above with reference to FIG. 2.

If the determination at block 315 is true, then the physical address obtained from the page table entry is included within main memory 115, so control continues to block 325 where the memory management unit 125 determines whether the reference indicator 204 in the page table entry (previously found at block 310) is clear.

If the determination at block 325 is true, then the reference indicator 204 is clear, so control continues to block 330 where the memory management unit 125 sets the reference indicator 204. Control then continues to block 335 where the memory management unit 125 accesses the contents in the main memory 115 at the address specified in the physical address field 202 for the page table entry. Control then continues to block 399 where the function returns.

If the determination at block 325 is false, then the reference indicator 204 is set, so control continues to block 340 where the memory management unit 125 sets the re-reference indicator value in the re-reference indicator field 206 associated with the page table entry. Control then continues to block 335 where the memory management unit 125 accesses the contents in the main memory 115 at the address specified in the physical address field 202 for the page table entry. Control then continues to block 399 where the function returns.

If the determination at block 315 is false, then the physical address obtained from the page table entry is not included within main memory 115, so control continues to block 320 where the memory management unit 125 raises an interrupt, which causes the virtual memory manager 140 to perform the functions as further described below with reference to FIG. 4. In other embodiments, the memory management unit 125 may use any appropriate mechanism to cause the virtual memory manager 140 to execute. Control then continues to block 399 where the function returns.

Figure 4:
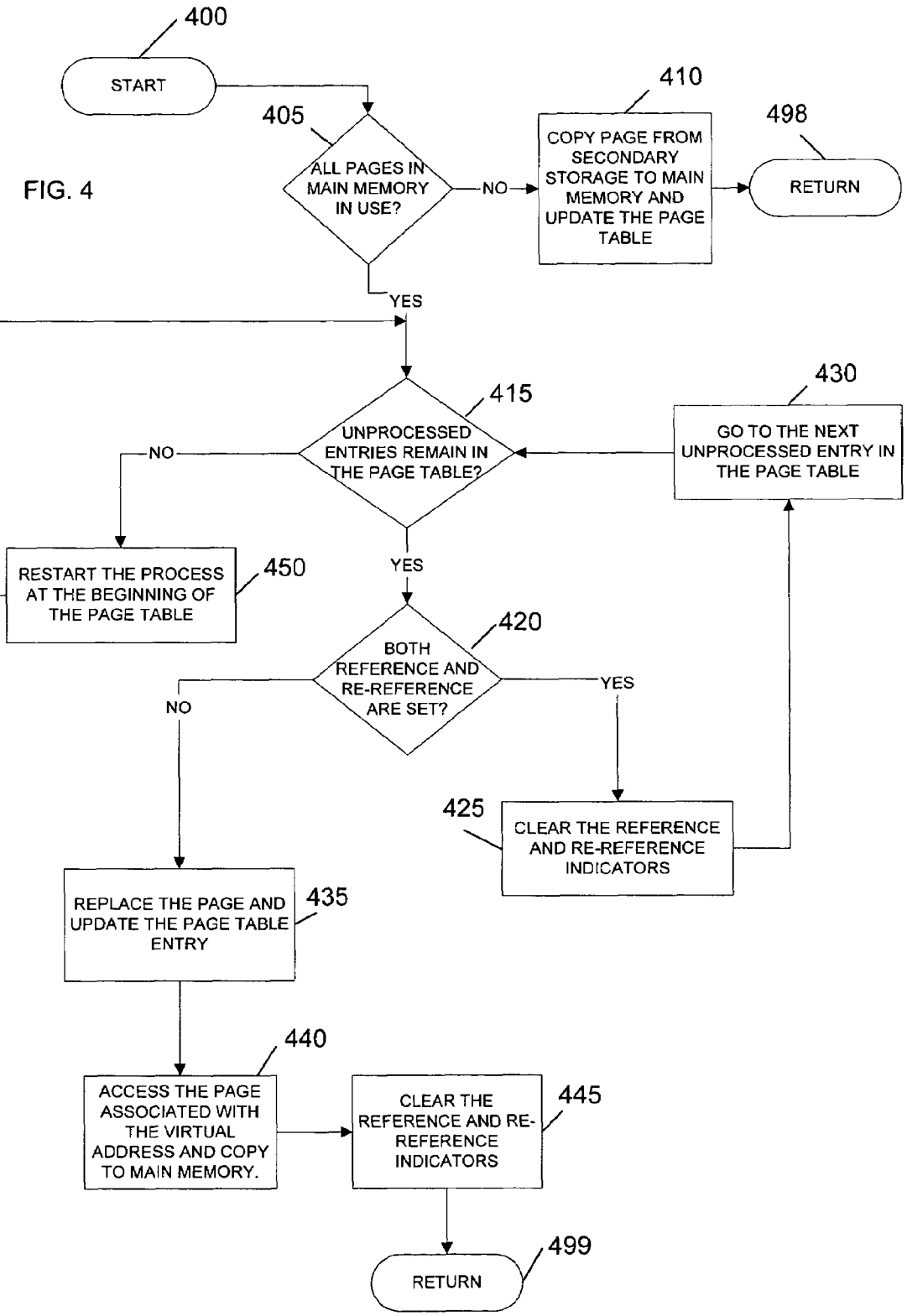
FIG. 4 depicts a flowchart of example processing of a virtual memory manager, according to an embodiment of the invention.

FIG. 4 depicts a flowchart of example processing of the virtual memory manager 140, according to an embodiment of the invention. Control begins at block 400. Control then continues to block 405 where the virtual memory manager 140 determines whether all of the pages in main memory 115 are currently in use, i.e., the main memory 115 is full and thus no free pages are available.

If the determination at block 405 is false, then all pages are not in use, so control continues to block 410 where the virtual memory manager 140 copies the page associated with the virtual address from the secondary storage 110 to the main memory 115 and updates the page table 130 to indicate that the page associated with the virtual address is now in the main memory 115. Control then continues to block 498 where the function returns.

If the determination at block 405 is true, then all pages are in use, so control continues to block 415 where the virtual memory manger 140 determines whether there are any unprocessed page table entries remaining in the page table 130. If the determination at block 415 is true, then there are unprocessed page table entries, so control continues to block 420 where the virtual memory manager 140 determines whether both the reference indicator 204 and the re-reference indicator 206 are set for the entry in the page table 130.

If the determination at block 420 is true, then both the reference indicator 204 and the re-reference indicator 206 are set, so control continues to block 425 where the virtual memory manger 140 clears the reference indicator 204 and clears the re-reference indicator 206. Control then continues to block 430 where the virtual memory manger 140 sets the current entry to be the next unprocessed entry in the page table 130. Control then returns to block 415, where the virtual memory manger begins processing the next entry in the page table 130 as previously described above.

If the determination at block 420 if false, then both the reference indicator 204 and the re-reference indicator 206 are not set, so control continues to block 435 where the virtual memory manager 140 steals the page in the main memory 115 associated with the current entry in the page table. In an embodiment, the virtual memory manager 140 steals the page by clearing the valid indicator 210 for the page to indicate the page is no longer in the main memory 115 and writing the page from the main memory 115 to the secondary storage 110 if the page has been modified since it was last written to the secondary storage 110.

Control then continues to block 440 where the virtual memory manager 140 accesses the page associated with the virtual address in the secondary storage device 110 and copies it to the main memory 115 to the location of the page that was previously stolen at block 435. In another embodiment, the virtual memory manager 140 creates a new page if the page associated with the virtual address does not already exist in the secondary storage device 110. The virtual memory manager 140 further sets the valid indicator 210 in the entry associated with the virtual address to indicate that the page is now in the main memory 115. Control then continues to block 445 where the virtual memory manager 140 clears the reference indicator 204 and the re-reference indicator 206 in the page table entry associated with the virtual address. Control then continues to block 499 where the function returns.

If the determination at block 415 is false, then there are no unprocessed page table entries, so control continues to block 450 where the virtual memory manager 140 restarts the process at the beginning of the page table 130. Control then returns to block 415 for another pass through the page table 130, as previously above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   receiving an instruction to access a first page;
   determining whether to replace a second page in memory with the first page based on a reference indicator and a re-reference indicator for the second page, wherein the reference indicator indicates whether the second page has been accessed since the second page was loaded into the memory, and wherein the re-reference indicator indicates whether the second page has been accessed subsequent to the reference indicator being set; and
   replacing the second page in the memory with the first page if both the reference indicator and the re-reference indicator are clear.

2. The method of claim 1, further comprising:
   replacing the second page in the memory with the first page if the reference indicator is set and the re-reference indicator is clear.

3. The method of claim 1, wherein the determining further comprises:
   clearing the reference indicator and the re-reference indicator if both the reference indicator and the re-reference indicator are set and all pages in the memory are in use.

4. The method of claim 1, wherein the reference indicator is set by a memory management unit when the second page is accessed and the reference indicator was previously clear.

5. The method of claim 1, wherein the re-reference indicator is set by a memory management unit when the second page is accessed and the reference indicator was previously set.

6. A computer readable storage medium encoded with instructions, wherein the instructions when executed by a processor comprise:
   when all of a plurality of pages in main memory are in use and a first page is not in main memory, searching a plurality of entries in a page table, wherein each of the plurality of entries includes a reference indicator and a re-reference indicator; and
   when both the reference indicator and re-reference indicator are clear in a second entry of the plurality of entries, replacing a second page of the plurality of pages in the main memory with the first page, wherein the second page is associated with the second entry.

7. The computer readable storage medium of claim 6, further comprising:

when both the reference indicator and re-reference indicator are clear in the second entry, setting a valid indicator in a first entry of the plurality of entries, wherein the first entry is associated with the first page.

8. The computer readable storage medium of claim 6, further comprising:
when the reference indicator is set and the re-reference indicator is clear in the second entry of the plurality of entries, replacing the second page in the main memory with the first page.

9. The computer readable storage medium of claim 8, further comprising:
when the reference indicator is set and the re-reference indicator is clear in the second entry, setting a valid indicator in a first entry of the plurality of entries, wherein the first entry is associated with the first page.

10. The computer readable storage medium of claim 6, further comprising:
when both the reference indicator and the re-reference indicator are set in the second entry, clearing the reference indicator and the re-reference indicator.

11. A computer readable storage medium encoded with a page table, wherein the page table comprises at least one entry associated with at least one respective page, wherein the at least one entry comprises:
a reference indicator, wherein a memory management unit is to set the reference indicator when the respective page is accessed in main memory; and
a re-reference indicator, wherein the memory management unit is to set the re-reference indicator when the respective page is accessed in main memory and the reference indicator was previously set.

12. The computer readable storage medium of claim 11, wherein a virtual memory manager is to replace the respective page in main memory with a second page from secondary storage when both the reference indicator and re-reference indicator are clear.

13. The computer readable storage medium of claim 11, wherein a virtual memory manager is to replace the respective page in main memory with a second page from secondary storage when the reference indicator is set and the re-reference indicator is clear.

14. The computer readable storage medium of claim 11, wherein a virtual memory manager is to clear both the reference indicator and the re-reference indicator when all pages in the main memory are in use and both the reference indicator and the re-reference indicator are set.

15. A processor comprising:
a page table comprising a plurality of entries, wherein each of the plurality of entries has a reference indicator and a re-reference indicator; and
a memory management utility to
set the reference indicator when an associated page is accessed in main memory and the reference indicator was previously clear, and
set the re-reference indicator when the associated page is accessed in the main memory and the reference indicator was previously set.

16. The processor of claim 15, wherein the memory management utility is further to determine whether to raise an interrupt to a virtual memory manager when an address associated with an instruction is not in the main memory.

17. An electronic device comprising:
a processor that
sets a reference indicator in a page table entry when an associated page is accessed in main memory and the reference indicator was previously clear, and
sets a re-reference indicator in the page table entry when the associated page is accessed in the main memory and the reference indicator was previously set; and
secondary storage encoded with a virtual memory manager that clears the reference indicator and the re-reference indicator if both the reference indicator and the re-reference indicator are set, the main memory is full, and a new page from the secondary storage is accessed.

18. The electronic device of claim 17, wherein the virtual memory manager further:
replaces the associated page in the main memory with the new page when both the reference indicator and the re-reference indicator are clear.

19. The electronic device of claim 17, wherein the virtual memory manager further:
replaces the associated page in the main memory with the new page when the reference indicator is set and the re-reference indicator is clear.

* * * * *

UNITED STATES PATENT AND TRADEMARK OFFICE
CERTIFICATE OF CORRECTION

| | | |
|---|---|---|
| PATENT NO. | : 7,080,220 B2 | Page 1 of 1 |
| APPLICATION NO. | : 10/614628 | |
| DATED | : July 18, 2006 | |
| INVENTOR(S) | : Andrew Dunshea and Dirk Michel | |

It is certified that error appears in the above-identified patent and that said Letters Patent is hereby corrected as shown below:

TITLE PAGE:
Item (56) References Cited, U.S. Patent Documents-delete "2002/0120822 A1" and replace with --2002/0120821 A1--.

Signed and Sealed this

Twenty-sixth Day of December, 2006

JON W. DUDAS
*Director of the United States Patent and Trademark Office*